United States Patent
Wang et al.

(10) Patent No.: US 10,928,304 B2
(45) Date of Patent: Feb. 23, 2021

(54) METHOD FOR ADJUSTING AND CONTROLLING BOUNDARY OF GRAPHENE

(71) Applicant: SHANGHAI INSTITUTE OF MICROSYSTEM AND INFORMATION TECHNOLOGY, CHINESE ACADEMY OF SCIENCES, Shanghai (CN)

(72) Inventors: Haomin Wang, Shanghai (CN); Lingxiu Chen, Shanghai (CN); Li He, Shanghai (CN); Huishan Wang, Shanghai (CN); Hong Xie, Shanghai (CN); Xiujun Wang, Shanghai (CN); Xiaoming Xie, Shanghai (CN)

(73) Assignee: SHANGHAI INSTITUTE OF MICROSYSTEM AND INFORMATION TECHNOLOGY, CHINESE ACADEMY OF SCIENCES, Shanghai (CN)

( * ) Notice: Subject to any disclaimer, the term of this patent is extended or adjusted under 35 U.S.C. 154(b) by 0 days.

(21) Appl. No.: 15/990,777

(22) Filed: May 28, 2018

(65) Prior Publication Data
US 2019/0094128 A1    Mar. 28, 2019

(30) Foreign Application Priority Data

Sep. 27, 2017  (CN) .......................... 201710890641.2

(51) Int. Cl.
*G01N 21/17* (2006.01)
*C01B 32/182* (2017.01)
*C01B 32/186* (2017.01)
*B82Y 40/00* (2011.01)

(52) U.S. Cl.
CPC .......... *G01N 21/17* (2013.01); *C01B 32/182* (2017.08); *C01B 32/186* (2017.08); *B82Y 40/00* (2013.01)

(58) Field of Classification Search
None
See application file for complete search history.

(56) References Cited

U.S. PATENT DOCUMENTS

| | | | |
|---|---|---|---|
| 9,570,294 B2 * | 2/2017 | Wang | H01L 21/02527 |
| 2011/0300058 A1 * | 12/2011 | Strupinski | B82Y 30/00 |
| | | | 423/448 |
| 2013/0078424 A1 * | 3/2013 | Ding | C23C 16/0254 |
| | | | 428/141 |

* cited by examiner

*Primary Examiner* — Alexander G Ghyka
(74) *Attorney, Agent, or Firm* — Global IP Services; Tianhua Gu

(57) ABSTRACT

A method for adjusting and controlling a boundary of graphene, comprising: providing an insulating substrate and placing the insulating substrate in a growth chamber; and feeding first reaction gas into the growth chamber, the first reaction gas at least comprising carbon source gas, and controlling a flow rate of the first reaction gas to forming a graphene structure having a first boundary shape on a surface of the insulating substrate through controlling a flow rate of the first reaction gas. The present invention realizes the controllability of the boundary of the graphene by adjusting the ratio of the carbon source gas to catalytic gas in the growth process of graphene on the surface of the substrate; the present invention can enable graphene to sequentially continuously grow by changing growth conditions on the basis of already formed graphene, so as to change the original boundary shape of the graphene.

13 Claims, 3 Drawing Sheets

Armchair boundary    Zigzag boundary

METHOD FOR ADJUSTING AND CONTROLLING BOUNDARY OF GRAPHENE

BACKGROUND OF THE PRESENT INVENTION

Field of Invention

The present invention belongs to the field of low-dimension materials and new materials, in particular to a method for adjusting and controlling growth boundary of graphene.

Description of Related Arts

Graphene is a two-dimension planar material having a hexagonal honeycomb structure formed by carbon atoms through $sp^2$ hybridization, and was widely concerned by people due to numerous excellent physical and chemical characteristics. Lattice structure of hexagonal boron nitride (h-BN) lattice structures similar to that of graphene, h-BN has a wide forbidden bandwidth, is called as "white graphene", is used as a typical representative together with graphene, and is concerned by the academic circle in recent years.

At present, a common method for preparing graphene is: directly growing graphene on a surface of metals such as Cu and Pt by adopting mechanical stripping, and chemical vapor deposition (CVD). After the grown of graphene is completed, in order to meet different application requirements, the prepared graphene needs to be transferred onto a corresponding insulating substrate. A transfer process of graphene itself is complicated and high-cost, which is not beneficial to large-scale production. At the same time, defects and impurities are inevitably introduced in the transfer process, which may greatly reduce the quality of graphene.

In order to improve the quality of graphene and reduce the production cost, directly growing graphene on the insulating substrate to avoid the transfer process is one of possible solutions. When graphene is grown on a surface of hexagonal boron nitride, since the surface of hexagonal boron nitride is flat, not only the electron mobility of the graphene can be effectively improved, but also many novel physical phenomena can be presented. At the same time, the growth and electrical properties of graphene will be greatly influenced by the boundary. Boundary control of graphene also becomes a hotspot of recent studies.

Therefore, it is really necessary to provide a method which is used for growing graphene and is capable of adjusting and controlling a boundary of graphene in a growth process.

SUMMARY OF THE PRESENT INVENTION

In view of the above-mentioned disadvantages of the prior art, the purpose of the present invention to provide a method for adjusting and controlling a boundary of graphene, which is used for solving the problem of adjustment and control of the boundary of graphene on a surface of an insulating substrate in the prior art.

In order to realize the above-mentioned purposes and other related purposes, the present invention provides a method for adjusting and controlling a boundary of graphene, which comprises the following steps:

1) providing an insulating substrate and placing the insulating substrate in a growth chamber; and 2) feeding first reaction gas into the growth chamber, the first reaction gas at least comprising carbon source gas, and forming a graphene structure having a first boundary shape on a surface of the insulating substrate through controlling a flow rate of the first reaction gas.

As one preferred solution of the present invention, in step 1), the insulating substrate is an h-BN substrate, and the h-BN substrate is selected from h-BN block monocrystal substrate, h-BN thin film substrate obtained through mechanical stripping, and h-BN thin film substrate obtained through a chemical vapor deposition method.

As one preferred solution of the present invention, step 1 further comprises the step of performing annealing to the insulating substrate to remove surface impurities.

As one preferred solution of the present invention, the carbon source gas is acetylene and a flow rate of acetylene is controlled to be 1-8 sccm to obtain the graphene structure having the first boundary shape of an armchair.

As one preferred solution of the present invention, in step 2), the first reaction gas further comprises catalytic gas, and the graphene structure having the first boundary shape on the surface of the insulating substrate is formed by controlling a flow rate ratio of the catalytic gas to the carbon source gas.

As one preferred solution of the present invention, in step 2), the carbon source gas comprises methane, ethylene, acetylene or a combination thereof; and the catalytic gas comprises silane.

As one preferred solution of the present invention, the flow rate ratio of the catalytic gas to the carbon source gas is controlled to be equal to 1:1 to obtain the graphene structure having the first boundary shape of a zigzag; the flow rate ratio of the catalytic gas to the carbon source gas is controlled to be greater than 8:1 or smaller than or equal to 1:8 to obtain the graphene structure having the first boundary shape of an armchair; and the flow rate ratio of the catalytic gas to the carbon source gas is controlled to be between 1:8 and 1:1 or between 1:1 and 8:1 to obtain the graphene structure having the first boundary shape of a mixed shape.

As one preferred solution of the present invention, in step 2), the graphene structure is prepared by chemical vapor deposition method, wherein growth temperature is 1100-1400° C., internal pressure of the growth chamber is 1-20 Pa and growth time is 10-1800 s.

As one preferred solution of the present invention, the method further comprises step 3) of sequentially feeding a second reaction gas into the growth chamber to obtain the graphene structure having a secondary boundary shape.

As one preferred solution of the present invention, if the first boundary shape is the armchair shape, the second reaction gas is controlled to be reaction gas which is suitable for growth of a zigzag boundary, so as to obtain the graphene structure having the secondary boundary shape of zigzag; and if the first boundary shape is zigzag shape, the second reaction gas is controlled to be reaction gas which is suitable for growth of an armchair boundary, so as to obtain the graphene structure having the secondary boundary shape of armchair.

As one preferred solution of the present invention, the second reaction gas which is suitable for growth of the zigzag boundary comprises catalytic gas and carbon source gas, and the flow rate ratio of the catalytic gas to the carbon source gas is equal to 1:1; and the second reaction gas which is suitable for growth of the armchair boundary comprises catalytic gas and carbon source gas, and the flow rate ratio of the catalytic gas to the carbon source gas is greater than 8:1 or smaller than or equal to 1:8.

As one preferred solution of the present invention, step 2) comprises firstly forming a step on the insulating substrate and then forming the graphene structure having the first boundary shape on the surface of the step.

As one preferred solution of the present invention, a method for forming the step comprises one of mechanical stripping, chemical etching, electron beam lithography and ultraviolet exposure.

As one preferred solution of the present invention, the shape of the step is consistent with the first boundary shape.

As one preferred solution of the present invention, the graphene structure formed on the surface of the step is a graphene nanoribbon, the first boundary shape is a zigzag shape, and forming conditions are that the first reaction gas comprises catalytic gas and carbon source gas, and a flow rate ratio of the catalytic gas to the carbon source is equal to 1:1.

As one preferred solution of the present invention, the graphene structure formed on the surface of the step is a graphene nanoribbon, the first boundary shape is an armchair shape, and forming conditions are that the first reaction gas comprises catalytic gas and carbon source gas, and a flow rate ratio of the catalytic gas to the carbon source is greater than 8:1 or smaller than or equal to 1:8, or the first reaction gas is carbon source gas and a flow rate of the carbon source gas is 1-8 sccm.

As one preferred solution of the present invention, width of the obtained graphene nano-belt is smaller than 100 nm, length is greater than 20 nm and thickness is equal to thickness of 1-10 atomic layers.

As one preferred solution of the present invention, width of the graphene structure is controlled by controlling the growth time of the graphene structure and the flow rate of the first reaction gas.

As described above, the method for adjusting and controlling the boundary of graphene provided by the present invention has the following beneficial effects:

1) the method for adjusting and regulating the boundary of graphene provided by the present invention realizes the controllability of the boundary of the graphene by adjusting the ratio of the carbon source gas to the catalytic gas in the growth process of graphene on the surface of the substrate;

2) the present invention can enable graphene to sequentially grow by changing growth conditions on the basis of already formed graphene, so as to change the original boundary shape of the graphene;

3) the method provided by the present invention can also grow graphene on the surface of the substrate having a step, a graphene ribbon with a specific orientation and a tidy boundary can be obtained by optimizing growth conditions through correspondingly oriented steps, and a narrow graphene nanoribbon can be obtained by further controlling the growth time and growth speed; and 4) the present invention realizes the adjustment and control of the boundary of graphene on the surface of the insulating substrate, simplifies the operating process, can more efficiently realize the adjustment and control of the boundary of graphene and lays a foundation for the wide application of graphene in the field of electronic devices.

DESCRIPTION OF COMPONENT MARK NUMBERS

| | |
|---|---|
| 11 | Zigzag boundary |
| 12 | Armchair boundary |
| S1-S2 | Steps |

DETAILED DESCRIPTION OF THE PREFERRED EMBODIMENTS

The implementation modes of the present invention will be described below through specific examples. One skilled in the art can easily understand other advantages and effects of the present invention according to contents disclosed in the description. The present invention may also be implemented or applied through other different specific implementation modes. Various modifications or variations may be made to all details in the description based on different points of view and applications without departing from the spirit of the present invention.

Figure 1:
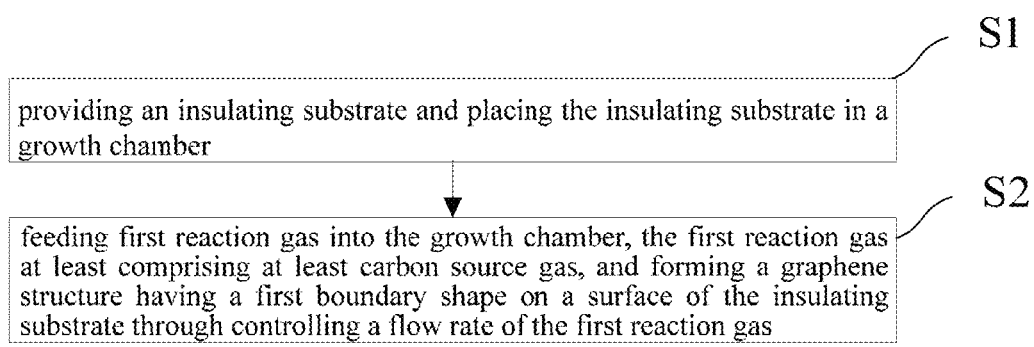
FIG. 1 illustrates a flowchart of a method for adjusting and controlling a boundary of graphene according to the present invention.
Figure 2:
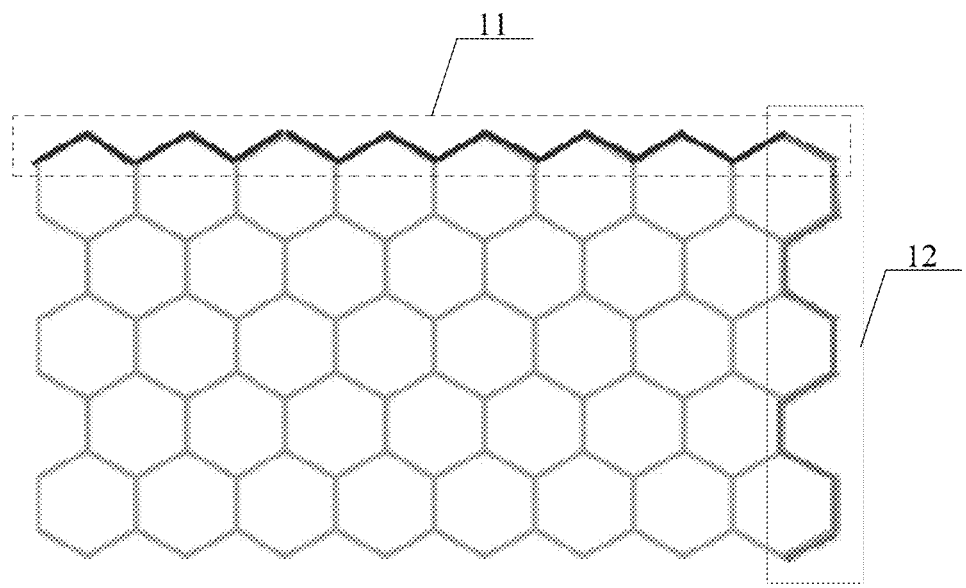
FIG. 2 illustrates a schematic view of shapes of two boundaries of graphene obtained through adjustment and control in the present invention.
Figure 3:
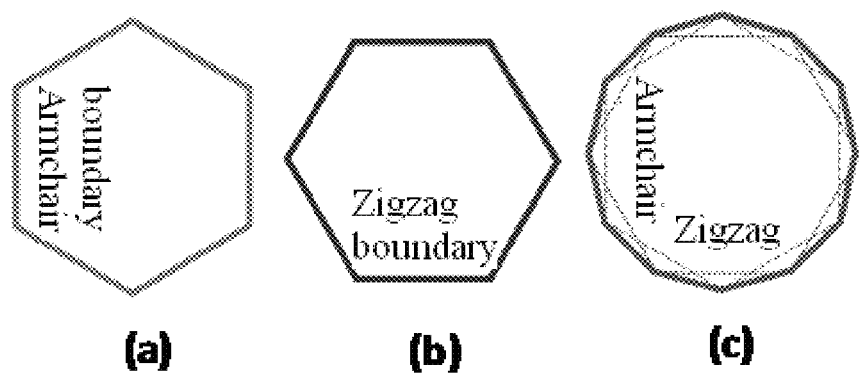
FIG. 3 illustrates a schematic view of an armchair boundary, a zigzag boundary and a mixed boundary monocrystal in the present invention.
Figure 4:
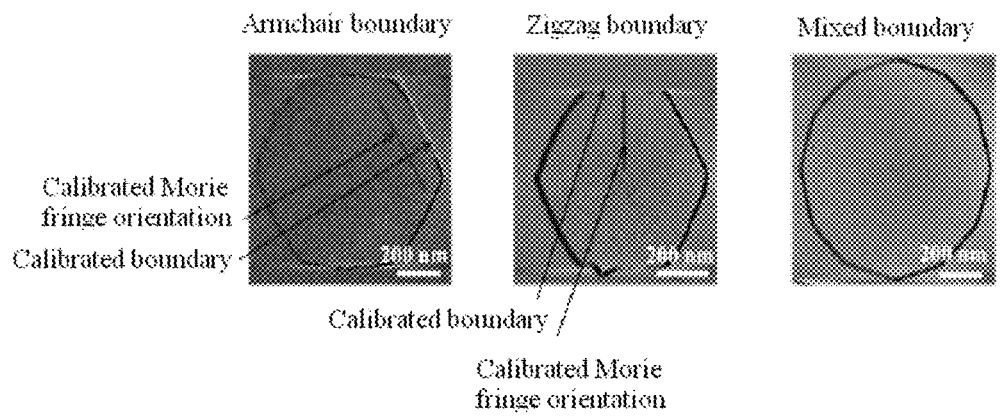
FIG. 4 illustrates a schematic view of calibration of an armchair boundary, a zigzag boundary and a mixed boundary calibration in the present invention.
Figure 5:
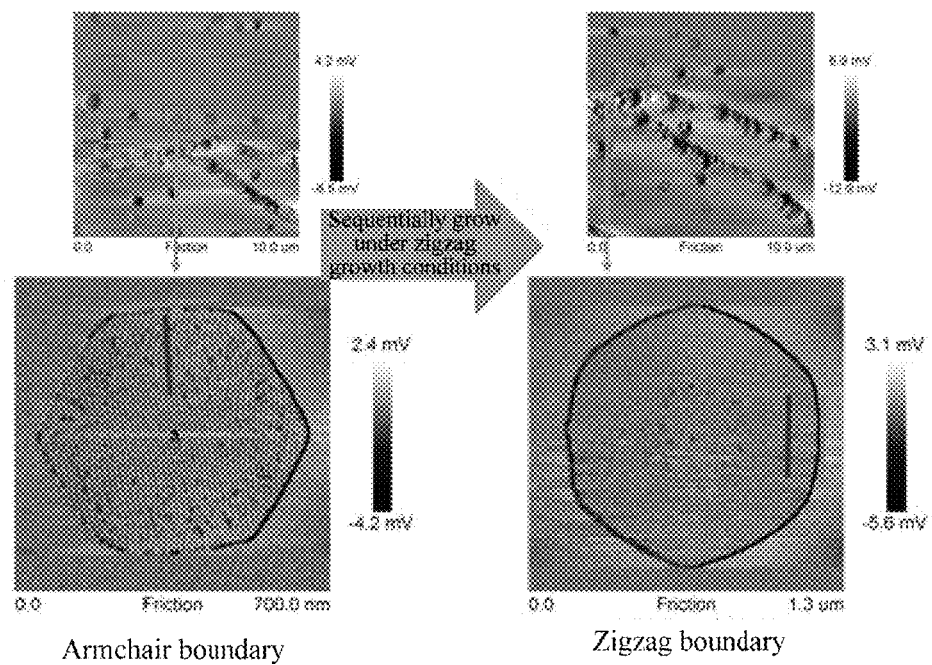
FIG. 5 illustrates a schematic view of a zigzag boundary monocrystal epitaxially and sequentially grown on an armchair monocrystal in the present invention.
Figure 6:
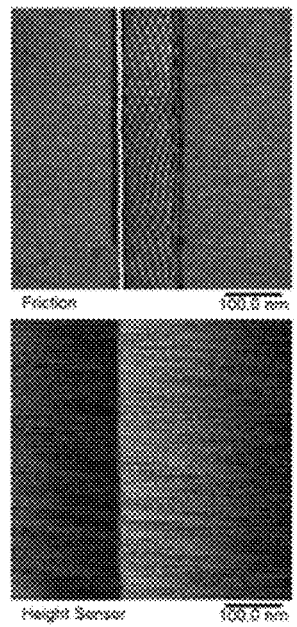
FIG. 6 illustrates a schematic view of epitaxial graphene nano-belts on armchair and zigzag steps in the present invention.
Figure 6:
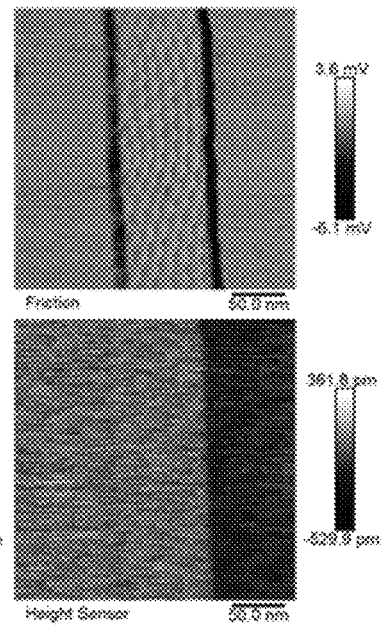

Please refer to FIG. 1 to FIG. 4. It needs to be stated that the drawings provided in the following embodiments are just used for schematically describing the basic concept of the present invention, thus only illustrate components only related to the present invention and are not drawn according to the numbers, shapes and sizes of components during actual implementation, the configuration, number and scale of each component during actual implementation thereof may be freely changed, and the component layout configuration thereof may be more complicated.

As illustrated in FIGS. 1-4, the present invention provides a method for adjusting and controlling a boundary of graphene, which comprises the following steps:

1) providing an insulating substrate and placing the insulating substrate in a growth chamber; and 2) feeding a first reaction gas into the growth chamber, the first reaction gas at least comprising carbon source gas, and forming a graphene structure having a first boundary shape on a surface of the insulating substrate through controlling a flow rate of the first reaction gas.

The method for adjusting and controlling the boundary of graphene provided by the present invention will be described below in detail with reference to the drawings.

Firstly, perform step 1): an insulating substrate is provided and the insulating substrate is placed in a growth chamber.

As an example, in step 1), the insulating substrate is an h-BN substrate, and the h-BN substrate is selected from h-BN block monocrystal substrate, h-BN thin film substrate obtained through mechanical stripping, and h-BN thin film substrate obtained through a chemical vapor deposition method.

Specifically, the insulating substrate may be any substrate in addition to h-BN substrates which are well-known by one skilled in the art. In this embodiment, a hexagonal boron nitride (h-BN) substrate is selected, and a method for preparing the h-BN substrate comprises: using monocrystal hexagonal boron nitride as a raw material and performing mechanical stripping on a silicon substrate having a silicon dioxide layer on an upper surface (silicon dioxide/silicon substrate) to obtain a hexagonal boron nitride sheet layer having a fresh cleavage surface to form a hexagonal boron nitride/silicon dioxide/silicon substrate. A hexagonal boron nitride thin film has a crystal structure similar to graphene, and has better insulating performance, heat conductivity, and chemical stability. By growing graphene on hexagonal boron nitride, the quality of graphene is improved. Further, the hexagonal boron nitride is a hexagonal boron nitride thin film obtained through a mechanical stripping method and having an atomic-scale flat cleavage surface.

In addition, in this embodiment, the growth chamber is described by taking a tubular furnace as an example, the hexagonal boron nitride/silicon dioxide/silicon substrate is placed in the tubular furnace, and mixed gas of hydrogen and argon is fed. In this embodiment, a flow rate of the mixed gas of hydrogen and argon is preferably configured to be 300 sccm, wherein a volume ratio of hydrogen to argon is preferably 1:2.

As an example, step 1) further comprises a step of performing annealing to the insulating substrate to remove surface impurities.

Specifically, high-temperature annealing treatment is performed to the insulating substrate to remove impurities, organic matters, or the like on the surface of the substrate, so as to obtain a high-quality substrate. By taking the hexagonal boron nitride substrate as an example, an annealing process is performed at an oxygen atmosphere, annealing temperature is configured to be 700-800° C., and is selected to be 750 C in this embodiment, annealing time is 0.5-3 h, and is selected to be 2 h in this embodiment, internal pressure of the growth chamber is controlled to be 500-1000 Pa, and is selected to be 600 Pa in this embodiment.

Secondly, perform step 2) is performed, i.e., first reaction gas is fed into the growth chamber, the first reaction gas at least comprising carbon source gas, and a flow rate of the first reaction gas is controlled to form a graphene structure having a first boundary shape on a surface of the insulating substrate.

Specifically, before and after the growth of the graphene structure, the method further comprises protecting the graphene structure through protection gas, wherein the protection gas is argon, and a flow rate is 100-500 sccm and preferably 200 sccm.

As an example, in step 2), the first reaction gas further comprises catalytic gas, and a flow rate ratio of the catalytic gas to the carbon source gas is controlled to form the graphene structure having the first boundary shape on the surface of the insulating substrate.

Specifically, the purpose of this step is to realize the controlling of the boundary of graphene by controlling the first reaction gas, wherein the first reaction gas at least comprises a carbon source, and of course, catalytic gas, or the like may be further comprised, and the first boundary shape of graphene obtained through control includes but not limited to armchair boundary, zigzag boundary, mixed boundary thereof and the like.

As an example, in step 2), the carbon source gas comprises methane, ethylene, acetylene or a combination thereof; the catalytic gas comprises silane.

Specifically, the carbon source gas provides a carbon source for the formation of graphene and is preferably acetylene in this embodiment; the catalytic gas comprises silane.

As an example, in step 2), the graphene structure is prepared by adopting a chemical vapor deposition method, wherein growth temperature is 1100-1400° C., internal pressure of the growth chamber is 1-20 Pa and growth time is 10-1800 s.

Specifically, in a growth process of graphene, growth temperature is preferably 1200-1300° C., and is selected to be 1250° C. in this embodiment; pressure is preferably 5-15 Pa, and is selected to be 10 Pa in this embodiment; and growth time is preferably 100-1000 s, and is selected to be 200 s in this embodiment. Width of graphene formed on the surface of the insulating substrate is 100 nm-1 µm, length is larger than 50 nm, and thickness is equal to thickness of 1-10 atomic layers.

As an example, the method further comprises step 3) of sequentially feeding second reaction gas into the growth chamber to obtain the graphene structure having a secondary boundary shape.

Specifically, the purpose of this step is to obtain graphene structure having a second boundary shape by controlling the flow rate of the second reaction gas, i.e., the original boundary shape of graphene may be changed by controlling the flow rate of the reaction gas, e.g., the armchair boundary of graphene can be sequentially grown to become a zigzag boundary and the zigzag boundary of graphene can also be sequentially grown to become an armchair boundary. Of course, the boundary may be changed to other shapes, which are not specifically limited herein. This method simply and quickly realizes the adjustment and control of the boundary of graphene and lays a foundation for wide application of graphene in the field of electronic devices.

As an example, step 2) comprises firstly forming a step on the insulating substrate and then forming the graphene structure having the first boundary shape on the surface of the step.

As an example, the graphene structure formed on the surface of the step is a graphene nanoribbon and the first boundary shape comprises one of zigzag and armchair shapes.

Specifically, the purpose of this step is to form a graphene structure on the step, and at this moment, the graphene structure is a graphene nanoribbon formed on the step surface of the insulating substrate.

As an example, a method for forming the step is selected from mechanical stripping, chemical etching, electron beam lithography and ultraviolet exposure. For example, 1-10 layers of boron nitride steps with length greater than 50 nm can be obtained on the surface of hexagonal boron nitride.

Specifically, the shape of the step may be set according to the actual need, and for example, can be obtained by adopting a metal-catalyzed etching method, wherein annealing etching in a formation process is annealing etching performed to h-BN in a CVD tubular furnace, carrier gas is Ar, and working gas is selected to be $H_2$ or $O_2$ according to different etching orientations, wherein, when a flow rate ratio of $H_2$ to Ar is 1:1 to 1:10, a nanoribbon groove having an armchair boundary structure is easily obtained; and when a flow rate ratio of $O_2$ to Ar is 1:1 to 0:10, a nanoribbon groove having a zigzag boundary structure is easily obtained. Preferably, the hexagonal boron nitride step is an armchair boundary step obtained through a mechanical stripping method or a zigzag boundary step obtained through the mechanical stripping method and a chemical etching method. Length of the step is larger than 200 nm, and depth is 1-9 atomic layers.

As an example, the growth time of the graphene structure and the flow rate of the first reaction gas are controlled to control the width of the graphene structure; and the shape of the step is controlled to enable that the first boundary shape is consistent with the shape of the step.

Specifically, by accurately controlling the growth time and decreasing the flow rate of growth gas, the width of the graphene belt can be restricted, so as to obtain a graphene nanoribbon with width smaller than 100 nm; and by controlling the shape of the step to be consistent with the boundary shape of graphene, a complete and tidy graphene layer having a boundary with a specific shape can be more effectively obtained.

Embodiment 1

In this embodiment, a graphene structure having an armchair boundary can be obtained by controlling the flow rate of the first reaction gas, the graphene structure may be graphene monocrystal or graphene nanoribbon.

As an example, in step 2), the first reaction gas only comprises carbon source gas.

Specifically, in this embodiment, the carbon source gas which exists only is preferably acetylenegas, and specific operations for forming graphene having an armchair boundary comprise: feeding carbon source gas, i.e., acetylene, wherein a flow rate is selected to be 8 sccm, a pressure range is regulated to be 1-20 Pa and is selected to be 10 Pa in this embodiment, temperature is regulated to be within 1100-1400° C. and is selected to be 1200° C. in this embodiment, growth time is 10-18 min and is selected to be 15 min, so as to obtain graphene monocrystal having an armchair boundary and having a size of 1 μm (diagonal length of hexagonal graphene monocrystal).

As an example, the first reaction gas further comprises catalytic gas, and a flow rate ratio of the carbon source gas to the catalytic gas is controlled to obtain graphene having armchair boundary.

Specifically, a flow rate ratio of the catalytic gas to the carbon source gas is controlled to be greater than 8:1 or smaller than or equal to 1:8, so as to obtain a graphene structure having the first boundary shape of armchair. In this embodiment, the carbon source gas is selected to be acetylene and the catalyst is selected to be silane, i.e., if the flow rate of acetylene is fixed to be 8, armchair and mixed boundaries will be obtained when the flow rate of silane changes from 0 to 7, wherein the mixed boundary refers to a graphene structure at least comprising armchair and zigzag boundaries, the catalytic gas includes but not limited to silane, and in this embodiment, the armchair boundary can be obtained when a ratio of silane to acetylene is controlled to be either 1:8 or 1:9.

In addition, the flow rate ratio of the catalytic gas to the carbon source gas is controlled to be between 1:8 and 1:1 or between 1:1 and 8:1, so as to obtain the graphene structure having the first boundary which is a mixed boundary, wherein the mixed boundary refers to a graphene structure at least comprising armchair and zigzag boundaries.

Embodiment 2

In this embodiment, a graphene structure having a zigzag boundary can be obtained by controlling the flow rate of the first reaction gas, the graphene may be graphene monocrystal or graphene nanoribbon.

As an example, the first reaction gas comprises carbon source gas and catalytic gas, and the flow rate ratio of the carbon source gas to the catalytic gas is controlled to obtain graphene having a zigzag boundary.

Specifically, a flow rate ratio of the catalytic gas to the carbon source gas is controlled to be equal to 1:1, i.e., the flow rate is 1 sccm: 1 sccm, 8 sccm:8 sccm or the like, so as to obtain a graphene structure having the first boundary shape of zigzag. In this embodiment, the carbon source gas is selected to be acetylene, the catalyst is selected to be silane, i.e., when the ratio of acetylene to silane is 8:8, a zigzag boundary is obtained, or when the flow rate of silane and acetylene is simultaneously changed within a flow rate range of 1-7, a zigzag boundary is obtained, and the catalyst gas includes but not limited to silane. In this embodiment, the ratio of silane to acetylene is controlled to be 3:3, 2:2, 1:1 or the like, a zigzag boundary can be always obtained.

In addition, the flow rate ratio of the catalytic gas to the carbon source gas is controlled to be between 1:8 and 1:1 or between 1:1 and 8:1, so as to obtain the graphene structure having the first boundary which is a mixed boundary, wherein the mixed boundary refers to a graphene structure at least comprising armchair and zigzag boundaries.

Embodiment 3

In this embodiment, a graphene structure having a secondary boundary shape can be obtained by controlling the flow rate of the second reaction gas, i.e., in this embodiment, the original boundary shape of graphene can be changed by controlling the flow rate of the reaction gas, e.g., the boundary shape of graphene in embodiment 1 can be changed to the boundary shape of graphene in embodiment 2, and the boundary of graphene in embodiment 2 can also be changed to the boundary shape of graphene in embodiment 1.

Specifically, if the first boundary shape is an armchair shape, the second reaction gas is controlled to be reaction gas which is suitable for growth of a zigzag boundary, so as to obtain the graphene structure having the second boundary shape of zigzag; and if the first boundary shape is an zigzag shape, the second reaction gas is controlled to be reaction gas which is suitable for growth of an armchair boundary, so as to obtain the graphene structure having the second boundary shape of armchair.

As an example, the second reaction gas which is suitable for the growth of the zigzag boundary has a flow rate ratio of catalytic gas to the carbon source gas equal to 1:1, i.e., the flow rate is 1 sccm: 1 sccm, 8 sccm:8 sccm or the like; and the flow rate ratio of the second reaction gas suitable for the growth of the armchair boundary has a flow rate ratio of the catalytic gas to the carbon source gas greater than 8:1 or smaller than or equal to 1:8.

Specifically, in this embodiment, the graphene monocrystal grown at an early state is a graphene monocrystal having an armchair boundary and a size of 1 μm which is obtained through growth for 15 min in acetylene only at a flow rate of 8 sccm; and at a later stage, the growth condition is changed to that a flow rate of acetylene to silane is 8:8 sccm and the monocrystal is sequentially grown for 10 min to obtain a graphene monocrystal having a zigzag boundary.

In addition, the carbon source is cut off after growth is completed and Ar is fed as protection gas at a flow rate of 100-500 sccm for cooling.

Embodiment 4

Embodiment differs from embodiment 1, embodiment 2 and embodiment 3 in that: step 2) in embodiment 4 comprises firstly forming a step on the insulating substrate and then forming the graphene structure having the first boundary shape on the surface of the step.

Specifically, since graphene is more easily nucleated and grown at the step of hexagonal boron nitride so as to form a graphene ribbon, a graphene ribbon having a specific orientation and a tidy boundary can be obtained by optimizing growth conditions through correspondingly oriented steps, and a narrow graphene nanoribbon can be obtained by further controlling the growth time and growth speed.

As an example, a method for forming the step is selected from mechanical stripping, chemical etching, electron beam lithography and ultraviolet exposure. The graphene structure formed on the surface of the step is a graphene nanoribbon, and the first boundary shape is one of zigzag shape and armchair shape.

As an example, formation conditions of the graphene nanoribbon having the zigzag boundary are that the first reaction gas comprises catalytic gas and carbon source gas, and a flow rate ratio of the catalytic gas to the carbon source is equal to 1:1, i.e., the flow rate is 1:1 sccm, 8:8 sccm or the like.

Specifically, in this embodiment, when epitaxially growing the graphene ribbon at the step of the boron nitride substrate comprises: if an graphene ribbon having a zigzag boundary is epitaxially grown, when the flow rate ratio of gas is 8:8 sccm, the growth speed is 140 nm/min; when the flow rate ratio of gas is 2:2 sccm, the growth speed is 60 nm/min; and when the flow rate ratio of gas is 1:1 sccm, the growth speed is 40 nm/min.

As an example, formation conditions of the graphene nanoribbon having the armchair boundary are that the first reaction gas comprises catalytic gas and carbon source gas, and a flow rate ratio of the catalytic gas to the carbon source is greater than 8:1 or smaller than or equal to 1:8, or the first reaction gas is carbon source gas and the flow rate of the carbon source gas is 1-8 sccm.

Specifically, in this embodiment, when epitaxially growing the graphene ribbon at the step of the boron nitride substrate comprises: if an graphene ribbon having an armchair boundary is epitaxially grown, when the flow rate of gas is 8 sccm, the growth speed is 45 nm/min; when the flow rate of gas is 2 sccm, the growth speed is 20 nm/min; and when the flow rate of gas is 1 sccm, the growth speed is 10 nm/min.

As an example, width of the graphene structure is controlled by controlling the growth time of the graphene structure and the flow rate of the first reaction gas; and the shape of the step is controlled to enable the first boundary shape to be consistent with the shape of the step.

As an example, width of the obtained graphene structure is smaller than 100 nm, length is greater than 20 nm, and thickness is equal to thickness of 1-10 atomic layers.

Specifically, by accurately controlling the growth time and decreasing the flow rate of growth gas, the width of the graphene ribbon can be restricted, so as to obtain a graphene nanoribbon with width smaller than 100 nm. Preferably, the width of the obtained graphene nanoribbon is 20-80 nm and is 40 nm in this embodiment, the length is 20-80 nm and is 60 nm in this embodiment, and the thickness is equal to thickness of 3-9 atomic layers and is equal to thickness of 6 atomic layers in this embodiment.

To sum up, the present invention provides a method for adjusting and controlling a boundary of graphene, comprising: providing an insulating substrate and placing the insulating substrate in a growth chamber; and feeding first reaction gas into the growth chamber, the first reaction gas at least comprising carbon source gas, and controlling a flow rate of the first reaction gas to form a graphene structure having a first boundary shape on a surface of the insulating substrate. By adopting the above-mentioned technical solution, the method for adjusting and regulating the boundary of graphene provided by the present invention realizes the controllability of the boundary of the graphene by adjusting the ratio of the carbon source gas to the catalytic gas in the growth process of graphene on the surface of the substrate; the method provided by the present invention can enable graphene to sequentially grow by changing growth conditions on the basis of already formed graphene, so as to change the original boundary shape of the graphene; the method provided by the present invention can grow graphene on the surface of the substrate having a step, a graphene ribbon with a specific orientation and a tidy boundary can be obtained by optimizing growth conditions through correspondingly oriented steps, and a narrow graphene nanoribbon can be obtained by further controlling the growth time and growth speed; and the present invention realizes the adjustment and control of the boundary of graphene on the surface of the insulating substrate, simplifies the operating process, can more efficiently realize the adjustment and control of the boundary of graphene and lays a foundation for the wide application of graphene in the field of electronic devices. Therefore, the present invention effectively overcomes various disadvantages in the prior art and thus has a great industrial utilization value.

The above-mentioned embodiments are just used for exemplarily describing the principle and effects of the present invention instead of limiting the present invention. One skilled in the art may make modifications or changes to the above-mentioned embodiments without going against the spirit and the range of the present invention. Therefore, all equivalent modifications or changes made by those who have common knowledge in the art without departing from the spirit and technical concept disclosed by the present invention shall be still covered by the claims of the present invention.

What is claimed is:

1. A method for adjusting and controlling a boundary of graphene, wherein the method comprises the following steps:
   1) providing an insulating substrate and placing the insulating substrate in a growth chamber;
   2) forming a step on the insulating substrate, feeding a first reaction gas into the growth chamber, the first reaction gas at least comprising carbon source gas, to form a graphene structure with a first boundary shape on a surface of the insulating substrate through controlling a flow rate of the first reaction gas; and
   3) feeding a second reaction gas into the growth chamber to change the first boundary shape into a second boundary shape;
   wherein the first boundary shape is an armchair shape, the second boundary shape is a zigzag shape; or
   the first boundary shape is a zigzag shape, the second boundary shape is an armchair shape.

2. The method for adjusting and controlling the boundary of graphene according to claim 1, wherein in step 1), the insulating substrate is an h-BN thin film substrate, the h-BN is selected from h-BN block monocrystal, and h-BN thin film substrate obtained through mechanical stripping, or h-BN thin film substrate obtained through a chemical vapor deposition method.

3. The method for adjusting and controlling the boundary of graphene according to claim 1, wherein in step 2), the carbon source gas is acetylene, a flow rate of acetylene is controlled to be 1-8 sccm to obtain the graphene structure having the first boundary shape of an armchair.

4. The method for adjusting and controlling the boundary of graphene according to claim 1, wherein in step 2), the first reaction gas further comprises catalytic gas, and the graphene structure having the first boundary shape on the surface of the insulating substrate is formed by controlling a flow rate ratio of the catalytic gas to the carbon source gas.

5. The method for adjusting and controlling the boundary of graphene according to claim 4, wherein in step 2), the carbon source gas comprises methane, ethylene, acetylene or a combination thereof; and the catalytic gas comprises silane.

6. The method for adjusting and controlling the boundary of graphene according to claim 4, wherein the flow rate ratio of the catalytic gas to the carbon source gas is controlled to be equal to 1:1 to obtain the graphene structure having the first boundary shape of zigzag; the flow rate ratio of the catalytic gas to the carbon source gas is controlled to be greater than 8:1 or smaller than or equal to 1:8 to obtain the graphene structure having the first boundary shape of armchair; and the flow rate ratio of the catalytic gas to the carbon source gas is controlled to be between 1:8 and 1:1 or between 1:1 and 8:1 to obtain the graphene structure having the first boundary shape of a mixed shape.

7. The method for adjusting and controlling the boundary of graphene according to claim 1, wherein in step 2), the graphene structure is prepared by chemical vapor deposition method, wherein growth temperature is 1100-1400° C., internal pressure of the growth chamber is 1-20 Pa and growth time is 10-1800 s.

8. The method for adjusting and controlling the boundary of graphene according to claim 1, wherein the first reaction gas which is suitable for growth of the zigzag boundary comprises catalytic gas and carbon source gas, and the flow rate ratio of the catalytic gas to the carbon source gas is equal to 1:1; and the second reaction gas which is suitable for growth of the armchair boundary comprises catalytic gas and carbon source gas, and the flow rate ratio of the catalytic gas to the carbon source gas is greater than 8:1 or smaller than or equal to 1:8.

9. The method for adjusting and controlling the boundary of graphene according to claim 1, wherein the method for forming the step comprises one of mechanical stripping, chemical etching, electron beam lithography and ultraviolet exposure.

10. The method for adjusting and controlling the boundary of graphene according to claim 1, wherein the shape of the step is consistent with the first boundary shape.

11. The method for adjusting and controlling the boundary of graphene according to claim 1, wherein the graphene structure formed on the surface of the step is a graphene nanoribbon, the first boundary shape is a zigzag shape, and forming conditions are that the first reaction gas comprises catalytic gas and carbon source gas, and a flow rate ratio of the catalytic gas to the carbon source is equal to 1:1.

12. The method for adjusting and controlling the boundary of graphene according to claim 1, wherein the graphene structure formed on the surface of the step is a graphene nanoribbon, the first boundary shape is an armchair shape, and forming conditions are that the first reaction gas comprises catalytic gas and carbon source gas, and a flow rate ratio of the catalytic gas to the carbon source is greater than 8:1 or smaller than or equal to 1:8, or the first reaction gas is carbon source gas and a flow rate of the carbon source gas is 1-8 sccm.

13. The method for adjusting and controlling the boundary of graphene according to claim 1, wherein width of the graphene structure is controlled by controlling the growth time of the graphene structure and the flow rate of the first reaction gas.

\* \* \* \* \*